Feb. 28, 1967 J. W. CRAWFORD ETAL 3,305,945
EDUCATIONAL TOY
Filed July 30, 1964

INVENTORS
John W. Crawford.
Frances Crawford.

United States Patent Office 3,305,945
Patented Feb. 28, 1967

3,305,945
EDUCATIONAL TOY
John W. Crawford and Frances Crawford, both of 1123 8th St. NE., Canton, Ohio 44704
Filed July 30, 1964, Ser. No. 386,159
5 Claims. (Cl. 35—35)

This invention relates to both education and toys, and more particularly to a toy-like device adapted to teach small children their A, B, C's, and simple words.

The main difficulty with most educational toys is their lack of ability to hold a small child's interest while he learns his A, B, C's. This is so often very boring to him.

It is, therefore, the most important object of this invention to provide an educational toy that will automatically cause the child to actually learn his A, B, C's, rather than to remember them by their association with certain combinations of colors or shapes of objects.

Another object of this invention is to provide an educational toy that will prevent the child from accidentally learning the letters of the alphabet in the wrong order when he is playing alone with the device.

Another object of this invention is to provide an educational toy that can be manufactured at such a low cost as to be available to even the poorest of families.

Another object of this invention is to provide an educational toy that can not only teach a child the alphabet, but a toy that can be produced to teach any desired word or combination of words.

Another object of this invention is to provide an educational toy that can be produced to teach the alphabet in any language, and in any size of characters.

Still another object of this invention is to provide an educational toy that can be used by a child of any age without the assistance of an adult.

Other objects and advantages of our invention will be understood as the description of this educational toy is read in connection with an examination of the accompanying drawing in which.

Figure 1:
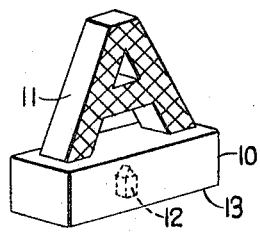
FIGURE 1 is a pictorial view of one of the letters that go to make up this invention.
Figure 2:
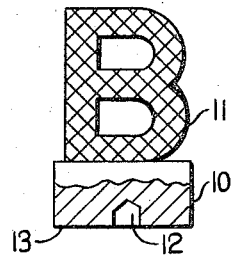
FIGURE 2 is a side view of another one of the letters with its base broken partly open in order to better show the internal configuration of the same.
Figure 3:
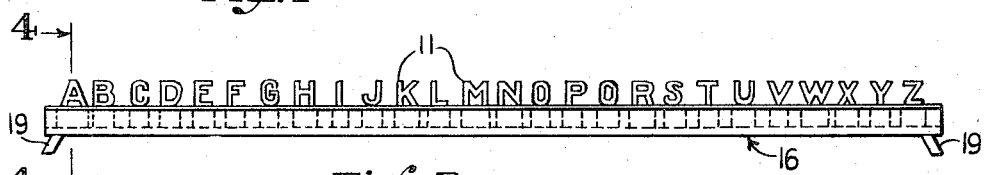
FIGURE 3 is a side view of this invention in its entirety.

In carrying out our invention, as shown in the accompanying drawing, there is indicated by the reference number 10 a rectangular block on which is either mounted or integrally formed with a letter 11 of the alphabet, which in FIGURE 1 is the capital letter A, while in FIGURE 2 is illustrated the capital letter B. A vertically disposed recess 12 is centrally located in the bottom 13 of the aforesaid rectangular block 10 for the reception of the pin 14 that projects vertically upward from the bottom 15 of the rack 16, which is U-shaped when viewed from the end, and which not only embodies the aforesaid bottom 15, but also two parallel and equally spaced sides 17 that are of a height equal to that of the rectangular block 10, of which there is one for each letter of the alphabet. The upper edge of each aforesaid side 17 terminates in an outwardly turned flange 18 that provides rigidity for the aforesaid rack 16, of which it is a part, and which has each end supported by an angular leg 19 located on the underside of each end thereof.

Figure 4:
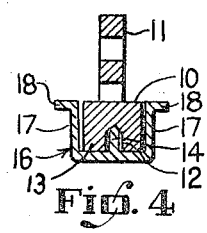
FIGURE 4 is a sectional view of this invention, taken substantially along line 4—4 of FIGURE 3, as viewed in the direction indicated by the arrows.
Figure 5:
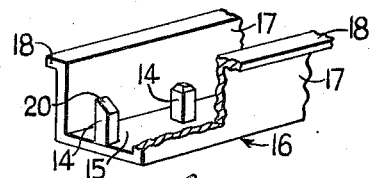
FIGURE 5 is a pictorial view of a portion of the body of this invention partly broken open to show its internal construction.
Figure 6:
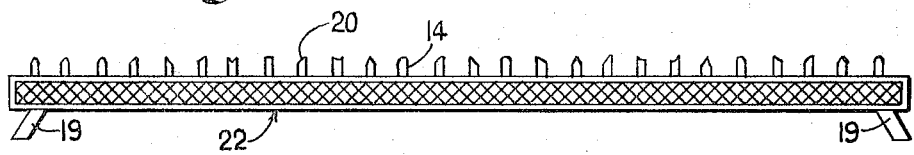
FIGURE 6 is a side view of an optional form of the body of this invention.
Figure 7:
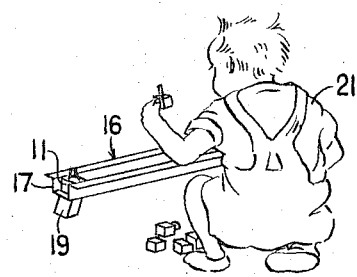
FIGURE 7 is a pictorial view of a child playing with this invention of an educational toy.

A close examination of FIGURES 4, 5, and 6 will show that the upper end 20 of each one of the aforesaid pins 14 is of a different configuration that fits into a matching of the proper recess 12 in the bottom of the aforesaid rectangular blocks 10.

When a child 21 wants to play with this educational toy, and thus learn the alphabet, he or she has only to pick up the proper block 10 with the desired letter 11, and place it on the proper pin 14 in the aforesaid rack 16. By doing this a number of times, the child will soon learn the alphabet, or if the device is made for one to spell out a given word or words, the child will soon learn the correct spelling of the words.

Although it is not shown in any view of the accompanying drawing, the pins 14 of this educational toy may each be of a different configuration in cross-section. One may be a square, as in FIGURE 5, another may be round, another elliptical, and still another hexagonal.

Although it has not previously been mentioned before, the body or rack portion of this invention may be constructed as shown in FIGURE 6 of the accompanying drawing, wherein the plurality of pins 14 are located on top of the rack which in this instance is noted by the reference number 22.

Our description in specific detail of a selected embodiment of the invention by way of example and to illustrate the principles involved, will suggest various changes, substitutions and other departures from our disclosure that properly lie within the spirit and scope of the appended claims.

What we now claim as new and desire to secure by Letters Patent is:

1. An educational toy of the character described, comprising a plurality of blocks, each one of which has a single letter of the alphabet projecting vertically upward therefrom; and a rack adapted to receive the said blocks; and a plurality of equally spaced and parallel pins projecting vertically upward from the bottom of the said rack; and each one of the said pins having an upper end with a vertical contour of a different configuration from that of the other pins; and each one of the said blocks having a vertically disposed recess in the bottom thereof, each recess having a vertical contour which matches the contour of only one pin, the said recess is adapted to receive a given pin in order that the blocks may be placed only in a predetermined order so that the vertically projecting letters are in the correct linear position when all of the blocks have been placed within the said rack.

2. An educational toy of the character described, comprising a plurality of rectangular blocks, each one of which has a single letter of the alphabet projecting vertically upward therefrom and integral with the blocks; and a rack adapted to receive the said blocks; and a plurality of equally spaced and parallel pins projecting vertically upward from the bottom of the said rack; and each one of the said pins having an upper end with a vertical contour of a different configuration from that of the other pins; and each one of the said blocks having a vertically disposed recess in the bottom thereof, each recess having a vertical contour which matches the contour of only one pin, the said recess is adapted to receive a given pin in order that the blocks may be placed only in a predetermined order so that the vertically projecting letters are in the correct linear position when all of the blocks have been placed within the said rack.

3. An educational toy of the character described, comprising a plurality of rectangular blocks, each one of which has a single letter of the alphabet projecting vertically upward therefrom and integral with the blocks; and a rack that is U-shaped when viewed from the end, the said rack being adapted to receive the said blocks; and a plurality of equally spaced and parallel pins projecting vertically upward from the bottom of the said rack; and each one of the said pins having an upper end with a vertical contour of a different configuration from that of the other pins; and each one of the said blocks having a vertically disposed recess in the bottom thereof, each recess having a vertical contour which matches the contour of only one pin, the said recess is adapted to receive a given pin in order that the blocks may be placed only in a predetermined order so that the vertically projecting letters are in the correct linear position when all of the blocks have been placed within the said rack.

4. An educational toy of the character described, comprising a plurality of rectangular blocks, each one of which has a single letter of the alphabet projecting vertically upward therefrom and integral with the blocks; and a rack that is U-shaped when viewed from the end, the said rack being provided with an angularly disposed leg projecting downward from the bottom of each end thereof, and the said rack being adapted to receive the said blocks; and a plurality of equally spaced and parallel pins projecting vertically upward from the bottom of the said rack; and each one of the said pins having an upper end with a vertical contour of a different configuration from that of the other pins; and each one of the said blocks having a vertically disposed recess in the bottom thereof, each recess having a vertical contour which matches the contour of only one pin, the said recess is adapted to receive a given pin in order that the blocks may be placed in a predetermined order so that the vertically projecting letters are in the correct linear position when all of the blocks have been placed within the said rack.

5. An educational toy of the character described, comprising a plurality of rectangular blocks, each one of which has a single letter of the alphabet projecting vertically upward therefrom and integral with the blocks; and a rack that is U-shaped when viewed from the end, the said rack being provided with an angularly disposed leg projecting downward from the bottom of each end thereof, and the said rack being adapted to receive the said blocks, when laid end to end in the said rack; and a plurality of equally spaced and parallel pins, each one of which is square in cross-section, the said pins projecting vertically upward from the bottom of the said rack; and each one of the said pins having an upper end with a vertical contour of a different configuration from that of the other pins; and each one of the said blocks having a vertically disposed recess in the bottom thereof, each recess having a vertical contour which matches the contour of only one pin, the said recess is adapted to receive a given pin in order that the blocks may be placed only in a predetermined order so that the vertically projecting letters are in the correct linear position when all of the blocks have been placed within the said rack.

References Cited by the Examiner

UNITED STATES PATENTS

| | | | |
|---|---|---|---|
| 1,343,721 | 6/1920 | Herrmann | 35—73 |
| 2,839,843 | 6/1958 | Keyko | 35—35.8 |
| 3,107,918 | 10/1963 | Edlen | 273—160 X |

FOREIGN PATENTS

| | | |
|---|---|---|
| 593,736 | 6/1925 | France. |
| 1,327,012 | 4/1963 | France. |

EUGENE R. CAPOZIO, *Primary Examiner.*

W. GRIEB, *Assistant Examiner.*